US012735355B2

(12) United States Patent
Yu et al.

(10) Patent No.: US 12,735,355 B2
(45) Date of Patent: Sep. 15, 2026

(54) METHOD FOR PREPARING GROUTING REINFORCEMENT FILLER FOR MINING

(71) Applicants: CCRI ( BEIJING) NEW MATERIAL TECHNOLOGY CO., LTD., Beijing (CN); CCTEG CHINA COAL RESEARCH INSTITUTE, Beijing (CN)

(72) Inventors: Xiaofeng Yu, Beijing (CN); Yuchao Wang, Beijing (CN); Dong Shen, Beijing (CN); Lizong Liu, Beijing (CN); Guangfeng Bai, Beijing (CN); Yifang Liu, Beijing (CN); Mingkun Zhang, Beijing (CN); Mengyuan Jia, Beijing (CN); Enqing Xie, Beijing (CN)

(73) Assignees: CCRI (BEIJING) NEW MATERIAL TECHNOLOGY CO., LTD., Beijing (CN); CCTEG CHINA COAL RESEARCH INSTITUTE, Beijing (CN)

( * ) Notice: Subject to any disclaimer, the term of this patent is extended or adjusted under 35 U.S.C. 154(b) by 714 days.

(21) Appl. No.: 18/182,836

(22) Filed: Mar. 13, 2023

(65) Prior Publication Data

US 2023/0391669 A1 Dec. 7, 2023

(30) Foreign Application Priority Data

Jun. 1, 2022 (CN) ........................ 202210617121.5

(51) Int. Cl.

| | |
|---|---|
| ***C04B 103/30*** | (2006.01) |
| ***C04B 16/06*** | (2006.01) |
| ***C04B 20/02*** | (2006.01) |
| ***C04B 26/16*** | (2006.01) |
| ***C04B 40/00*** | (2006.01) |
| ***C04B 103/40*** | (2006.01) |
| ***C04B 103/48*** | (2006.01) |
| ***C04B 111/00*** | (2006.01) |
| ***C08G 18/40*** | (2006.01) |
| ***C08G 18/42*** | (2006.01) |
| ***C08G 18/48*** | (2006.01) |
| ***C08G 18/76*** | (2006.01) |
| ***C08G 101/00*** | (2006.01) |
| *C04B 103/63* | (2006.01) |

(52) U.S. Cl.

CPC ........ *C04B 16/0675* (2013.01); *C04B 20/026* (2013.01); *C04B 2103/30* (2013.01); *C04B 2103/40* (2013.01); *C04B 2103/48* (2013.01); *C04B 2103/63* (2013.01)

(58) Field of Classification Search

CPC .. C04B 26/16; C04B 40/0039; C08G 18/4804

See application file for complete search history.

(56) References Cited

U.S. PATENT DOCUMENTS

| | | | | |
|---|---|---|---|---|
| 2016/0024268 | A1 * | 1/2016 | Nishiguchi ........ | C08G 18/4837 521/176 |
| 2019/0127542 | A1 * | 5/2019 | El-Khatib ............... | C08L 75/04 |
| 2019/0169350 | A1 * | 6/2019 | Kiszka ............... | C08G 18/6688 |

FOREIGN PATENT DOCUMENTS

| | | | |
|---|---|---|---|
| CN | 102558498 | A | 7/2012 |
| CN | 110845983 | A | 2/2020 |
| CN | 112194770 | A | 1/2021 |
| CN | 113429744 | A | 9/2021 |
| JP | 2021138787 | A | 9/2021 |

OTHER PUBLICATIONS

Machine translation of CN 102558498A obtained from the European Patent Office website in Feb. 2026 (Year: 2026).*

Cnipa, Office Action for CN Application No. 202210617121.5, Oct. 17, 2022.

* cited by examiner

*Primary Examiner* — Melissa A Rioja

(74) *Attorney, Agent, or Firm* — Hodgson Russ

(57) ABSTRACT

The present disclosure provides a grouting reinforcement filler for mining and a preparation method thereof. The grouting reinforcement filler for mining includes a first component and a second component. The first component includes 100 to 130 parts by weight of a polyol polymer, 0.8 to 1.2 parts by weight of a catalyst, 0.1 to 0.3 parts by weight of a foaming agent, and 0.5 to 1.5 parts by weight of a surfactant, and the second component includes 65 to 85 parts by weight of polyisocyanate, 5 to 15 parts by weight of a modifier, 10 to 20 parts by weight of a plasticizer, and 10 to 15 parts by weight of a reactive flame retardant.

15 Claims, No Drawings

METHOD FOR PREPARING GROUTING REINFORCEMENT FILLER FOR MINING

CROSS-REFERENCE TO RELATED APPLICATION

The application claims priority to Chinese Patent Application No. 202210617121.5, filed on Jun. 1, 2021, the entire disclosure of which is incorporated herein by reference.

FIELD

The present disclosure relates to a field of grouting reinforcement and filling technology for a coal-rock mass, and more particularly to a method for preparing a grouting reinforcement filler for mining.

BACKGROUND

At present, coal mining has been developed in scale and depth, and lithology of a coal-rock mass is getting worse and worse. In addition, due to influences of three "high" and one "disturbance", that is, high ground stress, high ground temperature, high osmotic pressure, and strong mining disturbance, stability of coal mine roadways is poor. In reinforcing the deformed roadways, it is difficult to provide sufficient anchoring force on the coal-rock mass with a large degree of fragmentation by single bolt support. When a coal mining working face passes through a geological structure area, roof falling, coal wall spalling and large faults are often encountered, which not only greatly reduces coal mining efficiency, but also causes a risk to safety production. With continuous development of practice and materials, grouting reinforcement may effectively solve the above-mentioned problems and has become an irreplaceable reinforcement method.

SUMMARY

In view of this, an object of the present disclosure is to provide a grouting reinforcing filler for mining to solve the above-mentioned problems existing in the related art to at least some extent.

Another object of the present disclosure is to provide a method for preparing a grouting reinforcement filler for mining.

In a first aspect of the present disclosure, a grouting reinforcement filler for mining is provided. The grouting reinforcement filler for mining includes a first component and a second component. A weight ratio of the first component to the second component is in a range of 0.85:1 to 1.15:1.

The first component includes 100 to 130 parts by weight of a polyol polymer, 0.8 to 1.2 parts by weight of a catalyst, 0.1 to 0.3 parts by weight of a foaming agent, and 0.5 to 1.5 parts by weight of a surfactant.

The second component includes 65 to 85 parts by weight of polyisocyanate, 5 to 15 parts by weight of a modifier, 10 to 20 parts by weight of a plasticizer, and 10 to 15 parts by weight of a reactive flame retardant.

In some embodiments, the polyol polymer is composed of a high ethylene oxide polyether polyol, a cross-linked polyether polyol and a phthalic anhydride polyester polyol, and a weight ratio of the high ethylene oxide polyether polyol, the cross-linked polyether polyol and the phthalic anhydride polyester polyol is in a range of 20:50:30 to 30:60:40.

In some embodiments, the high ethylene oxide polyether polyol is NRC2000, the cross-linked polyether polyol is DL400, and the phthalic anhydride polyester polyol is RAYNOL-3152.

In some embodiments, the catalyst is composed of a foaming catalyst and a gel catalyst, and a weight ratio of the foaming catalyst and the gel catalyst is in a range of 0.8:1 to 2.5:1.

In some embodiments, the foaming catalyst is pentamethyldiethylenetriamine, and the gel catalyst is 1,8-diazabicyclo[5.4.0]undec-7-ene.

In some embodiments, the foaming agent is water, and the surfactant is an organosilicon surfactant.

In some embodiments, the organosilicon surfactant is SZ-1959.

In some embodiments, the polyisocyanate is polyphenyl polymethylene polyisocyanate (PAPI).

In some embodiments, the modifier is AL-MIL101-$NH_2$.

In some embodiments, the plasticizer is dimethoxyethylene phthalate, coumarone-indene resin or a combination thereof.

In some embodiments, the reactive flame retardant is composed of diethyl bis(2-hydroxyethyl)aminomethyl phosphonate and dibromoneopentyl glycol, and a weight ratio of diethyl bis(2-hydroxyethyl)aminomethyl phosphonate and dibromoneopentyl glycol is in a range of 4:1 to 2:1.

In a second aspect of the present disclosure, a method for preparing the grouting reinforcement filler for mining is provided. The method includes:

- adding a catalyst, a surfactant and a foaming agent into a polyol polymer in sequence for stirring at room temperature to obtain a first component;
- modifying polyisocyanate with a modifier to obtain a modified polyisocyanate solution;
- adding a plasticizer and a reactive flame retardant into the modified polyisocyanate solution in a closed environment in sequence for stirring at room temperature to obtain a second component;
- mixing the first component and the second component in a weight ratio of 0.85:1 to 1.15:1 to obtain the grouting reinforcement filler for injecting into a fracture of a coal-rock mass through a grouting pump.

In some embodiments, the polyol polymer is composed of a high ethylene oxide polyether polyol, a cross-linked polyether polyol and a phthalic anhydride polyester polyol, and a weight ratio of the high ethylene oxide polyether polyol, the cross-linked polyether polyol and the phthalic anhydride polyester polyol is in a range of 20:50:30 to 30:60:40.

In some embodiments, the high ethylene oxide polyether polyol is NRC2000, the cross-linked polyether polyol is DL400, and the phthalic anhydride polyester polyol is RAYNOL-3152.

In some embodiments, the catalyst is composed of a foaming catalyst and a gel catalyst, and a weight ratio of the foaming catalyst and the gel catalyst is in a range of 0.8:1 to 2.5:1.

In some embodiments, the reactive flame retardant is composed of diethyl bis(2-hydroxyethyl)aminomethyl phosphonate and dibromoneopentyl glycol, and a weight ratio of diethyl bis(2-hydroxyethyl)aminomethyl phosphonate and dibromoneopentyl glycol is in a range of 4:1 to 2:1.

In some embodiments, the foaming catalyst is pentamethyldiethylenetriamine, and the gel catalyst is 1,8-diazabicyclo[5.4.0]undec-7-ene. In some embodiments, modifying polyisocyanate with the modifier includes:

grinding the modifier in a glove box without contact with water vapor;

adding the modifier into the polyisocyanate with a quantitative sampler to obtain a mixture;

stirring the mixture at a temperature of 80° C. for 6 h; and cooling the mixture to room temperature.

In some embodiments, the modifier is AL-MIL101-$NH_2$. AL-MIL101-$NH_2$ is prepared by the steps as follows. A certain amount of 2-aminoterephthalic acid ($H_2BDC$-$NH_2$) is completely dissolved in a certain volume of N,N-dimethylformamide (DMF) by heating and stirring at 110° C. A certain amount of aluminum chloride hydrated metal salt ($AlCl_3$ $6H_2O$) is divided into 5 equal parts and added into the above-mentioned heated solution in batches with a 10 min interval between each batch, while stirring. After the last part is added, the solution is stirred at 110° C. for 4 h, and then is poured into a 250 mL high-pressure reactor lined with Teflon. After standing at 110° C. for 20 h, the solution is cooled to room temperature, and then is filtered to obtain a yellow solid. The obtained solid is dipped 5 times with N, N-dimethylformamide (DMF) (30 mL for each time) and 5 times with formaldehyde (30 mL for each time), is activated through soxhlet extraction with ethanol for 24 hours, and is dried at 120° C. for 24 h in a vacuum to obtain AL-MIL101-$NH_2$.

In some embodiments, a weight ratio of the 2-aminoterephthalic acid and the aluminum chloride hydrate metal salt in preparing AL-MIL101-$NH_2$ is 2.1:2. Additional aspects and advantages of embodiments of the present disclosure will be given in part in the following descriptions, become apparent in part from the following descriptions, or be learned from the practice of the embodiments of the present disclosure.

DETAILED DESCRIPTION

The embodiments described herein with reference to drawings are explanatory, and used to generally understand the present disclosure, but not be construed to limit the present disclosure.

At present, grouting reinforcement materials may be divided into inorganic reinforcement materials, organic reinforcement materials and composite reinforcement materials. In applications of the coal mining, the inorganic materials are generally cement slurry, the organic materials are generally polyurethane, a phenolic resin and a urea formaldehyde resin, and the composite materials are generally silicate-modified polyurethane materials. For roadway support, the diffusion radius of the cement material is small, and it is difficult to inject small fractures; polyurethane and silicate-modified polyurethane have unbalanced reaction temperature and mechanical strength, and are generally used for reinforcement rather than filling; the phenolic resin and the urea formaldehyde resin has high foam rates as good filling materials, but has poor reinforcement effect and low mechanical strength, and such materials are easy to release free formaldehyde. For the mining face reinforcement, the cement material has slow curing and poor aging, and it is difficult to meet rapid coal mining requirements; the polyurethane and the silicate-modified polyurethane have high reaction temperatures; the pure organic polyurethane has a maximum reaction temperature exceeding 200° C. in large-volume grouting in fault areas, which causes risks of fire and smoke. In addition, these materials have serious heartburn after foaming, and the flame retardants are easy to migrate, resulting in a poor flame retardant effect. The phenolic resin and the urea formaldehyde resin have a poor reinforcement effect and poor environmental protection. Furthermore, in order to achieve the two functions of reinforcement and filling, the polyurethane and the phenolic resin are mixed on-site, which causes many safety accidents.

Therefore, there is a need to develop an adaptive grouting reinforcement filling material for both the roadway support and the mining face reinforcement, which may be used for reinforcement when the roadway has low fractures, and be used for filling when the roadway has large cavities, and such grouting reinforcement filling material may have a low reaction temperature, high mechanical strength and durable flame retardant.

The present disclosure provides a method for preparing a grouting reinforcement filler for mining.

The raw materials, reagents and equipment involved in examples and comparative examples of the present disclosure, unless otherwise specified, are all raw materials, reagents and equipment that can be commercially available. The methods involved in examples and comparative examples of the present disclosure, unless otherwise specified, are conventional methods.

Example 1 (E1)

A grouting reinforcement filler is composed of a component A and a component B. A weight ratio of the component A to the component B is 1:1. The component A includes 20 g of high ethylene oxide polyether polyol NRC2000, 60 g of cross-linked polyether polyol DL400, 30 g of phthalic anhydride polyester polyol RAYNOL-3152, 0.6 g of pentamethyldiethylenetriamine, 0.3 g of 1,8-diazabicyclo[5.4.0]undec-7-ene, 0.25 g of water and 1.2 g of organosilicon surfactant SZ-1959. The component B includes 75 g of polyphenyl polymethylene polyisocyanate, 8 g of AL-MIL101-$NH_2$, 15 g of plasticizer (including 10 g of dimethoxyethylene phthalate and 5 g of coumarone-indene resin), 7.5 g of diethyl bis(2-hydroxyethyl)aminomethyl phosphonate and 2.5 g of dibromoneopentyl glycol.

The method for preparing the grouting reinforcement filler for mining in the example includes the following steps.

(1) Preparation of AL-MIL101-$NH_2$

Since crystallization will be affected if more AL-MIL101-$NH_2$ is synthesized in the same reactor, AL-MIL101-$NH_2$ is synthesized in one reactor with an amount of 2.1 g of 2-aminoterephthalic acid and an amount of 2 g of aluminum chloride hydrated metal salt. The AL-MIL101-$NH_2$ is synthesized in multiple reactors (such as 10 reactors) at the same time. The synthesized AL-MIL101-$NH_2$ in all reactors is reserved and is added later according to the dosage of AL-MIL101-$NH_2$ in the mine grouting reinforcement filler.

The preparation method of AL-MIL101-$NH_2$ in a single reactor is as follows.

In a reactor, 2.1 g of 2-aminoterephthalic acid ($H_2BDC$-$NH_2$) was dissolved in 150 mL DMF, and was heated and stirred at 110° C. until completely dissolved. 2.0 g of aluminum chloride hydrated metal salt ($AlCl_3$ $6H_2O$) was divided into 5 equal parts and added into the above-mentioned heated solution in batches with a 10 min interval between each batch, while stirring. After the last part was added, the solution was stirred at 110° C. for 4 h, and then was poured into a 250 mL high-pressure reactor lined with Teflon. After standing at 110° C. for 20 h, the solution was cooled to room temperature, and then was filtered to obtain a yellow solid. The obtained solid was dipped 5 times with N,N-dimethylformamide (DMF) (30 mL for each time) and 5 times with formaldehyde (30 mL for each time), then was activated through soxhlet extraction with ethanol for 24 hours, and finally was dried at 120° C. for 24 h in a vacuum, so as to obtain 3.5 g of AL-MIL101-$NH_2$.

(2) AL-MIL101-$NH_2$ was modified to polyphenyl polymethylene polyisocyanate. AL-MIL101-$NH_2$ was ground in a glove box to avoid contact with water vapor. AL-MIL101-$NH_2$ was gradually added to polyphenyl polymethylene polyisocyanate (PAPI) with a quantitative sampler to obtain a mixture. The mixture was stirred at 80° C. for 6 h, and cooled to room temperature to obtain an AL-MIL101-$NH_2$ modified PAPI solution.

(3) Preparation of the component A. The high ethylene oxide polyether polyol NRC2000, the cross-linked polyether polyol DL400, the phthalic anhydride polyester polyol RAYNOL-3152, the pentamethyldiethylenetriamine, the 1,8-diazabicyclo[5.4.0]undec-7-ene, the organosilicon surfactant SZ-1959 and the water were added to a stainless steel reactor in sequence, and then stirred evenly at room temperature to obtain the component A.

(4) Preparation of the component B. In a dry environment (humidity less than 30%), the dimethoxyethylene phthalate, the camaron-indene resin, the diethyl bis (2-hydroxyethyl)aminomethyl phosphonate and the dibromoneopentyl glycol were added to the AL-MIL101-$NH_2$ modified PAPI solution in sequence, and stirred at room temperature (800 rmp, 20 min) to obtain the component B.

(5) The component A and the component B were mixed in a weight ratio of 1:1 to obtain the grouting reinforcement filler for injecting into a fracture of a coal-rock mass through a grouting pump.

Example 2 (E2)

Example 2 was essentially the same as Example 1 except that a mass ratio of the component A and the component B is 0.91:1.

Example 3 (E3)

Example 3 was essentially the same as Example 1 except that an amount of the high ethylene oxide polyether polyol NRC2000 was 25 g and an amount of the phthalic anhydride polyester polyol RAYNOL-3152 was 35 g in the component A.

Example 4 (E4)

Example 4 was essentially the same as Example 1 except that an amount of the high ethylene oxide polyether polyol NRC2000 was 30 g, an amount of the cross-linked polyether polyol was 50 g, and an amount of the phthalic anhydride polyester polyol RAYNOL-3152 was 40 g in the component A.

Example 5 (E5)

Example 5 was essentially the same as Example 1 except that an amount of the water was 0.1 g and an amount of the silicone surfactant SZ-1959 was 0.6 g in the component A.

Example 6 (E6)

Example 6 was essentially the same as Example 1 except that an amount of AL-MIL101-$NH_2$ was 14 g in the component B.

Example 7 (E7)

Example 7 was essentially the same as Example 1 except that an amount of AL-MIL101-$NH_2$ was 10 g in the component B.

Example 8 (E8)

Example 8 was essentially the same as Example 1 except that an amount of the polyphenyl polymethylene polyisocyanate was 65 g, an amount of the plasticizer was 10 g (5 g of dimethoxyethylene phthalate, 5 g of coumarone-indene resin), an amount of the diethyl bis(2-hydroxyethyl)aminomethyl phosphonate was 8 g, and an amount of the dibromoneopentyl glycol was 4 g in the component B.

Example 9 (E9)

Example 9 was essentially the same as Example 1 except that an amount of the polyphenyl polymethylene polyisocyanate was 85 g, an amount of the plasticizer was 20 g (15 g of dimethoxyethylene phthalate, 5 g of coumarone-indene resin), an amount of the diethyl bis(2-hydroxyethyl)aminomethyl phosphonate was 12 g, and an amount of the dibromoneopentyl glycol was 3 g in the component B.

Comparative Example 1 (CE1)

Comparative Example 1 was essentially the same as Example 1 except that the component A did not contain the water and the organosilicon surfactant SZ-1959.

Comparative Example 2 (CE2)

Comparative Example 2 was essentially the same as Example 1 except that the component A did not contain the high ethylene oxide polyether polyol NRC2000 and the phthalic anhydride polyester polyol RAYNOL-3152, and an amount of the cross-linked polyether polyol DL400 was 100 g.

Comparative Example 3 (CE3)

Comparative Example 3 was essentially the same as Example 1 except that the component B did not contain AL-MIL101-$NH_2$.

In preparation method, step (1) and step (2) were deleted, and AL-MIL101-$NH_2$ was not added in step (4). The component B was obtained by directly mixing and stirring dimethoxyethylene phthalate, coumarone-indene resin, diethyl bis(2-hydroxyethyl)aminomethyl phosphonate and dibromoneopentyl glycol at room temperature (800 rmp, 20 min).

Comparative Example 4 (CE4)

Comparative Example 4 was essentially the same as Example 1 except that the plasticizer in the component B did not contain dimethoxyethylene phthalate.

Comparative Example 5 (CE5)

Comparative Example 5 was essentially the same as Example 1 except that the plasticizer in the component B did not contain coumarone-indene resin.

II. Performance Testing

1. Performance Test Method

The sample preparation and the testing method for maximum reaction temperature, compressive strength, expansion coefficient, maximum flame extension length, maximum flame extension length and flame retardant conditions were performed according to AQ/T 1089-2020 "polymer materials for coal-rock mass reinforcement in coal mines".

Heartburn in consolidation: a total weight of 200 g filler slurry of the component A and the component B was weighed and mixed at a specified ratio, and was quickly poured into a mold. After the sample was cured or hardened, the sample was cut, and core spots and surrounding color of the sample were observed. The darker the color, the worse the heartburn.

2. Performance Test Results

Table 1 shows performance test results of the fillers in Example 1, Example 2, Example 5 and Example 6 and the Comparative Examples 1 to 5.

TABLE 1

Performance test results of fillers in Example 1, Example 2, Example 5 and Example 6 and the Comparative Examples 1 to 5.

| item | E1 | E2 | E5 | E6 | CE1 | CE2 | CE3 | CE4 | CE5 |
|---|---|---|---|---|---|---|---|---|---|
| maximum reaction temperature | 122 | 124 | 120 | 117 | 118 | 135 | 132 | 138 | 130 |
| compressive strength/M Pa | 87 | 90 | 88 | 86 | 85 | 90 | 76 | 77 | 69 |
| expansion coefficient | 1.0-3.0 (with adaptivity) | 1.0-3.0 (with adaptivity) | 1.0-1.5 (with adaptivity) | 1.0-3.0 (with adaptivity) | 1.0 (without adaptivity) | 1.0-3.0 (with adaptivity) | 1.0-3.0 (with adaptivity) | 1.0-3.0 (with adaptivity) | 1.0-3.0 (with adaptivity) |
| heartburn in consolidation | sample interior uniform, without any black spots (heartburn) | sample interior uniform, without any black spots (heartburn) | sample interior uniform, without any black spots (heartburn) | sample interior uniform, without any black spots (heartburn) | sample interior uniform, without any black spots (heartburn) | black spots (heartburn) in sample interior | sample interior uneven, a lot of black spots | sample interior uniform, without any black spots (heartburn) | sample interior uniform, without any black spots (heartburn) |
| maximum flame extension length, mm (alcohol lamp burning test) | 42 | 41 | 42 | 38 | 40 | 50 | 55 | 43 | 42 |
| maximum flame extension length, mm (alcohol blowtorch combustion test) | 55 | 53 | 54 | 51 | 53 | 66 | 74 | 56 | 54 |
| flame retardant condition | self-extinguishing away from the fire | self-extinguishing away from the fire | self-extinguishing away from the fire | self-extinguishing away from the fire | self-extinguishing away from the fire | burning away from the fire 1-2 s | burning away from the fire 2-3 s | self-extinguishing away from the fire | self-extinguishing away from the fire |

Note: the compressive strength is obtained in a closed mold. If the material is foaming, the compressive strength is slightly reduced.

As can be seen from Table 1, compared with Comparative Example 1, the filler has self-adaptability when the foaming agent, the water and the organosilicon surfactant SZ-1959 are added in Example 1 of the present disclosure. Compared with Comparative Example 2, the combination of the high ethylene oxide polyether polyol NRC2000, the cross-linked polyether polyol DL400 and the phthalic anhydride polyester polyol RAYNOL-3152 in the component A in Example 1 of the present disclosure slightly reduces the maximum flame extension length and the maximum flame extension length, and improves the maximum reaction temperature, heartburn in the consolidation and flame retardant. Compared with Comparative Example 3, AL-MIL101-$NH_2$ is added to the component B in Example 1 in the present disclosure, the maximum flame extension length and the maximum flame extension length are slightly reduced, and the maximum reaction temperature, the tensile strength, heartburn in the consolidation and flame retardant condition are greatly improved. Compared with Comparative Example 4, the plasticizer containing dimethoxyglycol phthalate is added in the component B in Example 1 of the present disclosure, the maximum reaction temperature is reduced and the compressive strength is increased. Compared with Comparative Example 5, the plasticizer containing the gumaron-ninhydrin resin is added in the component B in Example 1 in the present disclosure, the maximum reaction temperature is decreased and the compressive strength is increased. However, there is little difference in performance between the fillers of Example 1, Example 2, Example 5 and Example 6 of the present disclosure.

In summary, the grouting reinforcement filler for mining in the embodiments of the the present disclosure has the function of self-adaptive adjustment, and may used for reinforcement or filling with low-expansion foaming according to the geological characteristics to be reinforced, which achieves high efficiency flame retardant, no heartburn, low heat release and high mechanical strength.

In the present disclosure, the grouting reinforcement filler may be used for reinforcement and filling. When a growing degree of the fracture the coal-rock mass is low, the material is not foaming, and mainly is used for bonding reinforcement. In a case of facing goaf, large fault or fracture containing water, a slurry foaming ratio is about 2 to 5 times, which may quickly fill the fracture and save material consumption.

AL-MIL101-$NH_2$ is used as the modifier for cooling down, enhancement and inhibiting heartburn, and is grafted to a polymer skeleton by chemical bond as a flame retardant action site for long-term flame retardant and avoiding migration of flame retardant elements. AL-MIL101-$NH_2$ is used as a reinforcement modifier, which may not only improve material strength, but also effectively reduce active units of polyisocyanate and reaction heat of the slurry. If the material is foaming, AL-MIL101-$NH_2$ may be evenly dispersed into the foam to act as a reactive flame retardant (similar to $AL(OH)_3$), thereby avoiding heartburn inside the foam without migrating failure. Conventional additive flame retardants are easily migrating.

The combination of the high ethylene oxide polyether polyol, the cross-linked polyether polyol, the phthalic anhydride polyester polyol, the dimethoxyethylene phthalate and the coumarone-indene resin may achieve a balance between high strength and low temperature, and the slurry has excellent fluidity, which is conducive to grouting.

The water is used as the foaming agent, which has environmental protection and a low cost.

The method for preparing the grouting reinforcement filler for mining in the embodiments of the present disclosure is simple in process and convenient in operation.

Reference throughout this specification to "an embodiment," "some embodiments," "an example," "a specific example," or "some examples," means that a particular feature, structure, material, or characteristic described in connection with the embodiment or example is included in at least one embodiment or example of the present disclosure. Thus, the appearances of the above-mentioned phrases throughout this specification are not necessarily referring to the same embodiment or example of the present disclosure. Furthermore, the particular features, structures, materials, or characteristics may be combined in any suitable manner in one or more embodiments or examples.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A grouting reinforcement filler for mining, comprising a first component and a second component;

wherein a weight ratio of the first component to the second component is in a range of 0.85:1 to 1.15:1;

the first component comprises 100 to 130 parts by weight of a polyol polymer, 0.8 to 1.2 parts by weight of a catalyst, 0.1 to 0.3 parts by weight of a foaming agent, and 0.5 to 1.5 parts by weight of a surfactant; and the second component comprises 65 to 85 parts by weight of polyisocyanate, 5 to 15 parts by weight of a modifier, 10 to 20 parts by weight of a plasticizer, and 10 to 15 parts by weight of a reactive flame retardant.

2. The grouting reinforcement filler according to claim 1, wherein the catalyst is composed of a foaming catalyst and a gel catalyst, and a weight ratio of the foaming catalyst and the gel catalyst is in a range of 0.8:1 to 2.5:1.

3. The grouting reinforcement filler according to claim 2, wherein the foaming catalyst is pentamethyldiethylenetriamine, and the gel catalyst is 1,8-diazabicyclo[5.4.0]undec-7-ene.

4. The grouting reinforcement filler according to claim 1, wherein the foaming agent is water, and the surfactant is an organosilicon surfactant.

5. The grouting reinforcement filler according to claim 1, wherein the polyisocyanate is polyphenyl polymethylene polyisocyanate.

6. The grouting reinforcement filler according to claim 1, wherein the modifier is AL-MIL101-$NH_2$.

7. The grouting reinforcement filler according to claim 1, wherein the plasticizer is dimethoxyethylene phthalate, coumarone-indene resin or a combination thereof.

8. The grouting reinforcement filler according to claim 1, wherein the reactive flame retardant is composed of diethyl bis(2-hydroxyethyl)aminomethyl phosphonate and dibromoneopentyl glycol, and a weight ratio of diethyl bis(2-hydroxyethyl)aminomethyl phosphonate and dibromoneopentyl glycol is in a range of 4:1 to 2:1.

9. A method for preparing the grouting reinforcement filler for mining according to claim 1, comprising:

adding the catalyst, the surfactant and the foaming agent into the polyol polymer in sequence and stirring at room temperature to obtain the first component;

modifying the polyisocyanate with the modifier to obtain a modified polyisocyanate solution;

adding the plasticizer and the reactive flame retardant into the modified polyisocyanate solution in a closed environment in sequence and stirring at room temperature to obtain the second component; and mixing the first component and the second component in a weight ratio of 0.85:1 to 1.15:1 to obtain the grouting reinforcement filler for mining.

10. The method according to claim 9, wherein the catalyst is composed of a foaming catalyst and a gel catalyst, and a weight ratio of the foaming catalyst and the gel catalyst is in a range of 0.8:1 to 2.5:1.

11. The method according to claim 9, wherein the reactive flame retardant is composed of diethyl bis(2-hydroxyethyl) aminomethyl phosphonate and dibromoneopentyl glycol, and a weight ratio of diethyl bis(2-hydroxyethyl)aminomethyl phosphonate and dibromoneopentyl glycol is in a range of 4:1 to 2:1.

12. The method according to claim 10, wherein the foaming catalyst is pentamethyldiethylenetriamine, and the gel catalyst is 1,8-diazabicyclo[5.4.0]undec-7-ene.

13. The method according to claim 9, wherein modifying polyisocyanate with the modifier comprises:

grinding the modifier in a glove box without contact with water vapor;

adding the modifier into the polyisocyanate with a quantitative sampler to obtain a mixture;

stirring the mixture at a temperature of 80° C. for 6 h; and cooling the mixture to room temperature.

14. The method according to claim 9, wherein the modifier is AL-MIL 101-$NH_2$, and the AL-MIL101-$NH_2$ is prepared by:

dissolving 2-aminoterephthalic acid ($H_2BDC$-$NH_2$) in N,N-dimethylformamide (DMF) by heating and stirring at 110° C. to obtain a solution heated;

dividing aluminum chloride hydrated metal salt into 5 equal parts to be added into the solution heated in batches with a 10 min interval between each batch, while stirring;

stirring the solution at 110° C. for 4 h, pouring the solution into a 250 mL high-pressure reactor lined with polytetrafluoroethylene, and standing at 110° C. for 20 h;
cooling the solution to room temperature, and filtering the solution to obtain a yellow solid;
dipping the yellow solid 5 times with 30 mL of N, N-dimethylformamide (DMF) for each time and 5 times with 30 mL of formaldehyde for each time;
performing soxhlet extraction on the yellow solid with ethanol for 24 hours for activating; and
drying the yellow solid activated at 120° C. for 24 h in a vacuum to obtain AL-MIL101-$NH_2$.

15. The method according to claim 14, wherein a weight ratio of the 2-aminoterephthalic acid and the aluminum chloride hydrated metal salt in preparing AL-MIL 101-$NH_2$ is 2.1:2.

* * * * *